Patented Mar. 30, 1937

2,075,362

UNITED STATES PATENT OFFICE 2,075,362

METAL POLISH

Ida Selleck and Florence Ray, Ypsilanti, Mich.

No Drawing. Application May 5, 1936,
Serial No. 78,042

1 Claim. (Cl. 134—24)

This invention relates to a polish for metal and the like that is particularly effective in removing rust and dirt and at the same time giving high luster to the polished surface.

Many formulas have been proposed for metal polishes including many combinations of ingredients but the ingredients in the present polish are quite different from those usually employed in polishes and the results of using the polish are especially good. According to this invention, the polish, which is to be applied in the usual way, is as follows:

| | |
|---|---|
| Tripoli powder | pounds 1½ |
| Vinegar | cup ½ |
| Powdered beeswax | teaspoonful ½ |
| Diatomaceous earth | ounces 4 |
| Water (preferably rain) | gallon 1 |
| White corn meal | teaspoonful ½ |
| Condensed milk | (Quantity sufficient to make a thick cream) |

In compounding the polish the powdered materials are mixed and the water and vinegar then added with vigorous stirring or shaking. Thereafter a sufficient quantity of condensed milk is added to thicken the mixture to the consistency of a thick cream polish.

The most satisfactory results have been obtained with the exact proportions of ingredients that are set out in the formula given above. It is to be understood, however, that variation of the formula within a reasonable range is within the scope of this invention and will still result in a highly satisfactory polish.

A kind of diatomaceous earth that has been found particularly satisfactory, is that sold under the name of "Snow Floss."

We claim:

A composition for polishing metal and the like that consists of:

| | |
|---|---|
| Tripoli powder | pounds 1½ |
| Vinegar | cup ½ |
| Powdered beeswax | teaspoonful ½ |
| Diatomaceous earth | ounces 4 |
| Water (preferably rain) | gallon 1 |
| White corn meal | teaspoonful ½ |
| Condensed milk | (Quantity sufficient to make a thick cream) |

IDA SELLECK.
FLORENCE RAY.